United States Patent
Ku et al.

(10) Patent No.: US 9,143,469 B2
(45) Date of Patent: Sep. 22, 2015

(54) MICROBLOG CLIENT, METHOD FOR AGGREGATING MICROBLOG MESSAGES, AND INSTANT MESSAGING CLIENT

(71) Applicant: TENCENT TECHNOLOGY (SHENZHEN) COMPANY LIMITED, Guangdong (CN)

(72) Inventors: Yu Ku, Guangdong (CN); Hongjie Liu, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 419 days.

(21) Appl. No.: 13/693,121

(22) Filed: Dec. 4, 2012

(65) Prior Publication Data
US 2013/0091234 A1 Apr. 11, 2013

Related U.S. Application Data

(63) Continuation of application No. PCT/CN2011/079680, filed on Sep. 15, 2011.

(30) Foreign Application Priority Data

Sep. 19, 2010 (CN) .......................... 2010 1 0293479

(51) Int. Cl.
*G06F 15/16* (2006.01)
*H04L 12/58* (2006.01)

(52) U.S. Cl.
CPC ............... *H04L 51/04* (2013.01); *H04L 51/20* (2013.01)

(58) Field of Classification Search
CPC ....................................................... H04L 51/04

USPC .................................................. 709/204–206
See application file for complete search history.

(56) References Cited

U.S. PATENT DOCUMENTS

| 2004/0142709 | A1* | 7/2004 | Coskun et al. | 455/466 |
| 2005/0288044 | A1* | 12/2005 | Atkins et al. | 455/466 |
| 2010/0180029 | A1* | 7/2010 | Fourman | 709/225 |

FOREIGN PATENT DOCUMENTS

| CN | 1523903 A | 8/2004 |
| CN | 101299769 A | 11/2008 |

(Continued)

OTHER PUBLICATIONS

Korean Office Action for Application No. 10-2012-7032125 dated Mar. 25, 2014, and its English translation herewith.

(Continued)

*Primary Examiner* — Phuoc Nguyen
(74) *Attorney, Agent, or Firm* — Harness, Dickey & Pierce, P.L.C.

(57) ABSTRACT

The application provides a microblog client, a method for aggregating a microblog message, and an Instant Messaging (IM) client. The microblog client includes: a message pulling module, which is to pull a microblog message from an external network server according to location information; a message pool, which is to store the microblog message pulled by the message pulling module; and a geography page service module, which is to generate one or more geography pages, and display the microblog message on a corresponding geography page, based on the location information corresponding to the microblog message pulled. By adopting the client and method provided by the application, microblog messages may be aggregated based on the location information. And users may be facilitated to obtain microblog messages.

18 Claims, 3 Drawing Sheets

(56) References Cited

FOREIGN PATENT DOCUMENTS

| | | | |
|---|---|---|---|
| CN | 101304563 | A | 11/2008 |
| KR | 100740000 | B1 | 7/2007 |
| WO | 2010100354 | A1 | 9/2010 |

OTHER PUBLICATIONS

International Search Report; mailed Dec. 8, 2011; PCT/CN2011/079680.

\* cited by examiner

MICROBLOG CLIENT, METHOD FOR AGGREGATING MICROBLOG MESSAGES, AND INSTANT MESSAGING CLIENT

RELATED APPLICATIONS

This application is a continuation of International Application No. PCT/CN2011/079680, filed on Sep. 15, 2011, which claims the priority of CN application No. 201010293479.4, filed on Sep. 19, 2010, which is incorporated herein by reference.

FIELD OF THE TECHNOLOGY

The present invention relates to computer network technologies, and more particularly, to a microblog client, a method for aggregating microblog messages, and an Instant Messaging (IM) client.

BACKGROUND OF THE INVENTION

In recent years, instant messaging (IM) tools have been accepted by the majority of Internet users and become essential network tools. It should be noted that, network IM tools are widely used not only in usual entertainment, but also in users' work. The IM tools are frequently used by the users to communicate with their friends, colleagues and students in life and work. Therefore, users may put forward higher requirements in ease of use, stability, security and other aspects of IM tools (such as IM software). The IM tools mainly achieve a buddy independent chat mode for one to one, and a message chat mode for one to N in group or discussion group.

With continuous development of Internet applications, microblog or one-sentence blog (also known as microblog) appear. The microblog (e.g., twitter) is growing steadily as a new product and new application with information transmission mechanism of extension of IM tools. In the microblog, a user may express himself or herself with one sentence of 140 words for example. Messages may be quickly transmitted in this way, so that user message chat mode can be changed from one to one mode, one to N mode to one to endless mode. In such one to endless message chat mode, a person may transmit a message to infinite people, while the person may simultaneously obtain messages from more than ten thousands users, which put forward new requirements for the application with large amount of users.

Compared with other network communication tools, present IM is a conversational application, the interactive mode of which is the most primitive and the most natural, but less efficient. It usually needs a lot of dialogues to express a complete meaning. Blog is a document-type application, and there is no clear object to communicate with. A blogger may have a personal style or manner, and meanings can be expressed more completely, but the requirements to write a blog is high. Microblog uses short messages, and there is no clear object to communicate with. The meanings can be expressed more completely. The requirements to write microblog are very low. Microblog may be a sentence, and also may be a sigh with emotion. Therefore, compared with the IM and blog, the microblog tools such as twitter have higher information transmission efficiency and lower usage requirements.

In the existing microblog client, microblog messages are presented in chronological order, the information presentation way of which is relatively loose and lack of classification and aggregation strategy. For microblog module integrated into the IM client, microblog messages only present on IM main panel in chronological order.

Further, memory occupation amount is an important index to measure the performance of a computer application tool, and more particularly, for the application tools displaying a large quantity of messages such as microblog client. With the increasing messages received by the user, the information displayed on the interface becomes more and more, at the same time, the memory occupied by the application tool will become larger. There will be very serious consequences if no reasonable memory usage policy used.

SUMMARY OF THE INVENTION

The application provides a microblog client, a method for aggregating microblog messages, and an Instant Messaging (IM) client.

An embodiment of the application provides a microblog client, which includes a message pulling module, a message pool and a geography page service module, wherein the message pulling module is to pull a microblog message from an external network server according to location information;

the message pool is to store the microblog message pulled by the message pulling module; and the geography page service module is to generate one or more geography pages, and display the microblog message on a corresponding geography page, based on the location information corresponding to the microblog message pulled.

The message pulling module is to:

obtain corresponding local location information based on identity information of the microblog client, convert the local location information into a corresponding key value, send a message pulling request with the key value to the network server, and pull microblog message with corresponding key value in the network server to the microblog client.

The message pulling module is to:

convert history location information selected by a user of the microblog client or popular location information provided by the network server to a corresponding key value, send the message pulling request with the key value to the network server, and pull the microblog message with the corresponding key value in the network server to the microblog client.

The geography page service module includes a logic management sub-module, which is to configure a message pulling strategy; and the message pulling module is further to pull the microblog message from the network server, based on the message pulling strategy and the location information.

The message pulling strategy includes: number of messages obtained by a single pulling and total number of pulled messages, and the message pulling module is further to pull a corresponding number of the microblog message from the network server once, according to the number of messages obtained by a single pulling, trigger next pulling when detecting a scroll bar of a geography page is at the bottom, and stop pulling the microblog message when number of pulled messages reaches the total number of pulled messages.

The message pool is further to:

release a corresponding microblog message according to message elimination strategy, when number of stored messages reaches a message storing threshold.

The message pool is further to:

maintain reference count of one or more microblog messages stored in the message pool, and determine the message elimination strategy according to the reference count.

The message pool is further to:

monitor one or more geography pages, when a microblog message is displayed on a geography page, increase the reference count of the microblog message by one, and when a geography page is deconstructed, decrease the reference count of each microblog message previously displayed on the geography page.

The geography page service module includes a displaying sub-module, which is to:

search in a container pool of the microblog client to determine whether there is an available control, when generating one or more geography pages, when there is the available control, obtain the control from the container pool, fill the control obtained with the microblog message; when there is no available control in the container pool, establish a necessary control, and fill the control established with the microblog message.

The displaying sub-module is further to:

deconstruct the one or more geography pages generated, and store each control of the geography page into the container pool.

An embodiment of the application provides a method for aggregating a microblog message, which includes:

pulling, by a microblog client, the microblog message from a network server, according to location information;

storing, by the microblog client, the microblog message pulled;

generating, by the microblog client, one or more geography pages; and displaying, by the microblog client, the microblog message pulled on a corresponding geography page, according to the location information of the microblog message pulled.

Pulling by the microblog client the microblog message from the network server according to the location information includes:

obtaining, by the microblog client, corresponding local location information according to identity information of the microblog client, converting the local location information into a corresponding key value, sending a message pulling request with the key value to the network server, and pulling the microblog message with the corresponding key value in the network server to the microblog client.

Pulling by the microblog client the microblog message from the network server according to the location information includes:

converting, by the microblog client, history location information selected by the user or popular location information provided by the network server into a corresponding key value, sending a message pulling request with the key value to the network server, and pulling the microblog message with the corresponding key value in the network server to the microblog client.

The method further includes:

pulling, by the microblog client, a corresponding number of microblog messages from the network server once, according to a preset number of messages obtained by a single pulling, triggering next pulling when detecting a scroll bar of a geography page is at the bottom, and stopping pulling the microblog message when number of pulled messages reaches a preset total number of pulled messages.

The method further includes:

monitoring, by the microblog client, one or more geography pages, when a microblog message is displayed on a geography page, increasing reference count of the microblog message by one, when a geography page is deconstructed, decreasing the reference count of each microblog message previously displayed on the geography page by one, determining a message elimination strategy based on the reference count, and releasing the microblog messages stored in the microblog client.

The method further includes:

determining, by the microblog client, whether there is an available control, when one or more geography pages are generated;

when there is an available control, filling the available control with the microblog message to be displayed;

when there is no available control, establishing a control, and filling the control established with the microblog message to be displayed.

The identity information is an Internet Protocol (IP) address.

An embodiment of the application provides an Instant Messaging (IM) client, which includes a basic service module, a microblog module, wherein the basic service module is to store a conversion table of location information and key value;

the microblog module is to convert the location information as aggregation dimension into a corresponding key value based on the conversion table, send a message pulling message carrying the key value to an external network server, generate one or more geography pages, and display a microblog message on a corresponding geography page, based on the location information corresponding to the microblog message pulled.

The microblog module is to determine local location information according to identity information of the IM client, and convert the local location information determined to a corresponding key value according to the conversion table.

The microblog module is to convert history location information selected by a user of the IM client or popular location information provided by the network server to a corresponding key value, according to the conversion table.

With the client and method provided by the application, microblog messages may be aggregated based on location information, which may facilitate users to obtain the microblog messages.

EMBODIMENTS OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

In current mainstream applications of microblog client, users may eager to learn microblog messages at their location or other popular locations (also known as broadcast messages). If users are allowed to directly search for all the microblog messages of corresponding region in the manner of region classification, the classification aggregation management for information is achieved to some extent. In specific implementations, it may provide the same city broadcasting at user's current location, record information about a city selected by the user, provide microblog messages about the city, and adopt flexible popular place push strategy to facilitate users to obtain the microblog messages, and so on.

Correspondingly, the application provides a microblog client, a method for aggregating microblog messages and an Instant Messaging (IM) client, so as to aggregate the microblog messages based on location information. The provided client is a hardware device with processor, and may be implemented with loosely coupled structure. The client may impose load as little as possible on the server. In order to achieve the loosely coupled structure, the client may be implemented with design ideas of hierarchical model, so as to encapsulate related logical function into the same layer, as well as to enable to adopt interfaces and abstract data structures between layers for expression and communication. Subsequently, better reusability of each layer model may be obtained. In an embodiment of the application, the structure of the client includes 3 layers.

(1) Presentation layer, mainly used for encapsulation as well as interaction with users.

(2) Business logic layer, mainly used for functionally logic processing and state storing. The business logic layer is the core module of the client.

(3) Data layer, used for obtaining data (including network pulling, etc.) and organizing data.

Figure 1:
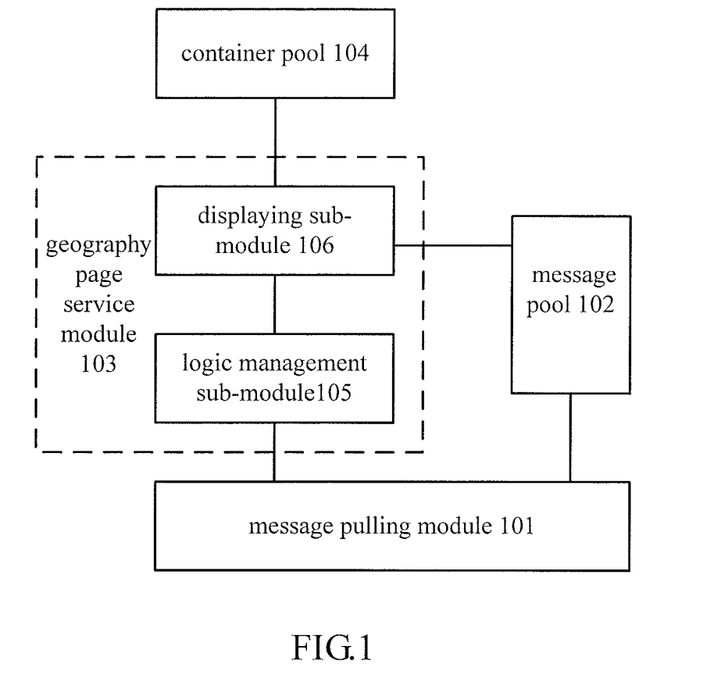
FIG. 1 is a schematic diagram illustrating the structure of a microblog client, in accordance with an embodiment of the application.

FIG. 1 is a schematic diagram illustrating the structure of a microblog client, in accordance with an embodiment of the application, the microblog client includes: a message pulling module 101, a message pool 102, and a geography page service module 103. The microblog client further includes a container pool 104.

The message pulling module 101 is configured to pull microblog messages from an external network server according to location information.

The message pool 102 is configured to store the microblog messages pulled by the message pulling module 101. It should be noted that, the message pool is a specific data storage space.

The geography page service module 103 is configured to generate one or more geography page, and display the microblog messages at a geography page corresponding to the location information, based on which the microblog messages have been pulled. In specific implementations, the geography page service module 103 may be configured to display the same city broadcasting geography page for a user through a display interface of the client. Microblog messages displayed on the geography page are published by other users in the same city with the user. It should be noted that, each microblog message has its corresponding location information.

In a specific implementation, before displaying a message, the geography page service module 103 needs to determine whether the required microblog messages are stored in the message pool 102. When the message pool 102 doesn't store the required microblog messages, the geography page service module 103 will trigger the message pulling module 101 to pull the microblog messages. After pulling the microblog messages from an external network server, the message pulling module 101 may store the pulled microblog messages into the message pool 102, meanwhile provide the pulled microblog messages for the geography page service module 103 to be displayed.

Specifically, the message pulling module 101 may obtain corresponding local location information according to identity information of the microblog client (such as Internet Protocol (IP) address), convert the local location information into a corresponding key value, send a message pulling request carrying the key value to the network server, and pull a microblog message with corresponding key value in the network server to the microblog client. It can be seen that, the message pulling module 101 communicates with the server via a network (such as Ethernet, mobile communication network, etc.), so as to obtain the required microblog message. In a specific implementation, the message pulling module 101 may configure a hardware interface that can be used for communication.

Alternatively, the message pulling module 101 may convert history location information selected by the user or popular location information provided by the network server into a corresponding key value, send the message pulling request carrying the key value to the network server, and pull a microblog message with corresponding key value in the network server to the microblog client.

In order to bring convenience to the user, the microblog client will record the user's historical location information (such as the location information viewed at the latest time), and store the information in a local file, so that the user can easily find the region he/she used to concern when login next time.

In addition, in order to adopt the more flexible popular place strategy, the popular location information can be packaged in the form of configuration files in an installation package of the microblog client, meanwhile same contents may be deployed on a network server. After the microblog client logging on successfully, the client will request the network server with version number of corresponding configuration file. When the network server finds the version number and self-stored contents do not match each other, for example the version number provided by the client is relatively old, the client may be enabled to start download process to obtain the configuration file stored in the server. Therefore, the microblog client can always read the latest configuration file, and change self-configured popular location timely according to current hot cities, without changing any code logic of the microblog client. Transparent pushing to all the clients may be achieved.

In practical applications, the user can access the same city broadcasting geography page by clicking on location of single news page of the microblog client. Title area of the same city broadcasting geography page includes the follows.

1. The user's current location, i.e., the user's local position. After clicking on the location, all the messages of current geography page may be refreshed.

2. Historical location, for example, a location selected by the user, including a location selected most recently or a location currently selected.

3. One or more popular location pushed by the server. The popular location may be managed by the server, and dynamically change according to current popularity.

Furthermore, a logic management sub-module 105 is set within the geography page service module 103. The logic management sub-module 105 is to set message pulling strategy, and logically manage multiple microblog messages according to geographical aggregation. Correspondingly, the message pulling module 101 is further to pull microblog messages from the network server, according to the message pulling strategy and the location information.

Specifically, the message pulling strategy includes: number of messages obtained by a single pulling and total number of pulled messages. Correspondingly, the message pulling module 101 is to pull corresponding number of microblog messages one-time from the network server, according to the number of messages obtained by a single pulling. The message pulling module 101 is further to trigger next pulling, when detecting scroll bar of geography page has been pulled to webpage bottom, and stop pulling microblog messages when the number of pulled messages reaches the total number of pulled messages.

In practical applications, since number of broadcasting messages in the same city is very large, server load will be huge when rebroadcasting chains about all the broadcasting messages are pulled one-time. In order to reduce server load to the largest extent, when guaranteeing service quality, a microblog client may adopt a certain messaging pulling strategy. Take into account client application scenario, strategy of batch and many times may be introduced in specific implementation of the application. For example, take into account length limitation (e.g., minimum number of bytes) of a network exchange between client and server, and an average length of a single broadcasting message, strategy of pulling 15 broadcasting messages once may be employed. These 15 broadcasting messages are aggregated based on location information, and subsequently are pulled to the microblog client once. In other words, the number of messages obtained by a single pulling may be set, to avoid pulling too many broadcasting messages. Furthermore, when a user has read the 15 messages pulled currently and pulled scroll bar down to the bottom, next batch pulling process may be triggered. This process will repeat until 120 messages have been pulled. That is, no pulling operation will be executed, based on trigger event of bottom scroll bar. Instead, words prompting to view more may be presented to the user, and jump to a corresponding webpage by allowing users to manually click on "more" button. In practical applications, the number of messages obtained by a single pulling and total number of pulled messages may be adjusted and modified as needed.

It should be noted that, a message pool set within a microblog client may be used to store contents about all the messages, and release messages no longer needed with a certain elimination algorithm when message number reaches a preset threshold. That is, the message pool 102 may be further used to release corresponding microblog messages according to message elimination strategy, when number of stored messages reaches a message storing threshold (i.e., maximum number of messages that can be stored). Specifically, the message pool 102 is used to record and maintain reference count of one or more microblog messages stored therein, and determine the message elimination strategy according to the reference count. For example, reference count of a message is increased by one when this message is displayed on a page; on the contrary, the reference count of the message is decreased by one when the page is deconstructed. When reference count of a message is 1, it means that no control shows this message, and memory data of the message can be released. It can be seen that, the message pool 102 is further used to monitor one or more geography page. When a microblog message is displayed on a geography page, reference count of the microblog message is increased by one. When a geography page is deconstructed, reference count about each message previously displayed on the geography page is decreased by one.

In specific applications, control mode used by each microblog message is similar, which possesses better reusability. A control may include control page and control item, and so on. Therefore, a displaying sub-module 106 is set within the geography page service module 103. The displaying sub-module 106 is used to search in a container pool 104, to determine whether there is a usable control in the container pool 104, when generating one or more geography page. When there is a usable control in the container pool 104, the displaying sub-module 106 is further to obtain the control from the container pool 104, and fill microblog messages into the control obtained. When there is no usable control, the displaying sub-module 106 is further to create a necessary control, and fill microblog messages into the control created. The microblog message filled into the control may be previously stored in the message pool 102, or may be newly pulled by the message pulling module 101 from a network server. Furthermore, the displaying sub-module 106, which is set within the geography page service module 103, is used to deconstruct the one or more geography page generated, and store control of the geography page into the container pool 104.

In other words, when a certain geography page is created, the geography page service module 103 will firstly search in the container pool 104 for available resources. When there are available resources in the container pool 104, the geography page service module 103 may fill a corresponding control with corresponding message contents, without establishing control page and each control item. When there are no available resources in the container pool 104, the geography page service module 103 may establish a control. When a user clicks on a "backspace" button, it means that current geography page may be deconstructed. Firstly, reference count about each message displayed on current geography page may be decreased by a corresponding number in the message pool 102. Furthermore, add the control page and control item into the container pool 104 for next usage.

It should be noted that, the logic management sub-module 105 in the geography page service module 103 is responsible for management and maintenance of life cycle of the displaying sub-module 106. However, the displaying sub-module 106 is only responsible for processes related with interface, such as interface displaying, user operation and so on.

Moreover, in order to effectively reduce screen flashing and performance loss generated by interface refreshment, each control item may be realized with self-drawn manner. That is, each control item calculates size and corresponding position of each area within the control. Thus more satisfactory performance consumption can be achieved by triggering re-arrangement of interface controls to the smallest extent, when guaranteeing user usage requirements. For example, when a user drags to change size of client interface, re-arrangement may not be triggered at every moment the user drags a mouse, but only be triggered at the moment the user releases the mouse.

Memory occupation amount is an important index to measure performance of a desktop application program. Memory occupation increasing is inevitable, accompanying with increasing of microblog messages aggregated to a microblog client. In specific applications, memory consumption may be reduced with the message pool 102 and container pool 104. Specifically, message eliminate strategy may be used for the message pool 102. Control multiplexing strategy may be used for the container pool 104.

In an example of the application, a microblog client may be implemented by taking Active Template Library (ATL) project of VS2005 as development environment. The microblog client may be an independent client, or a module of an Instant Messaging (IM) client. Correspondingly, the IM client includes: a basic service module, which is to store a conversion table of location information and key value; a microblog module, which is to convert location information as aggregation dimension into corresponding key value based on the conversion table, send a message pulling request carrying the key value to an external network server, generate one or more geography page, and display a microblog message on a corresponding geography page, based on the location information corresponding to the microblog message pulled. The IM client may also include a weather module, which may share the conversion table stored in the basic service module with the microblog module. That is, in order to better reuse the conversion table, in a specific application of the present invention, conversion table logic and so on may be extracted from plug-in components, such as the weather module, and may be put into the basic service module, which is a public APP layer.

Figure 2:
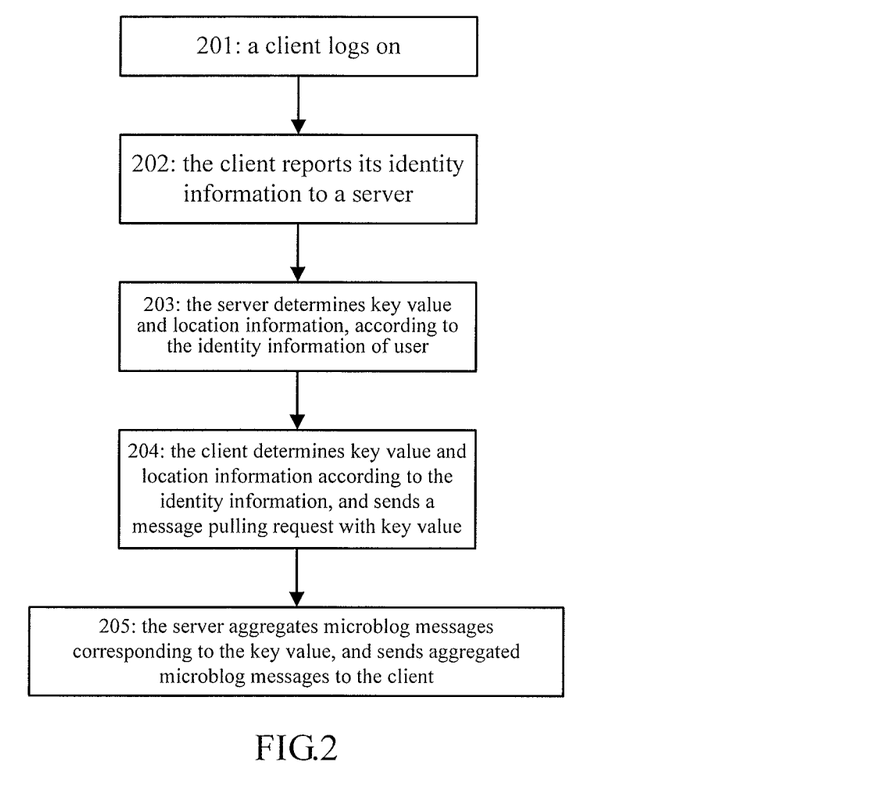
FIG. 2 is a flowchart illustrating a method for aggregating microblog messages based on location information, in accordance with an embodiment of the application.

In order to obtain user's location information, thereby jumping to a page of a city in which the user locates. An interaction with a server may be executed during QQ login process. An entire process is shown in FIG. 2.

Block 201: a client logs on. In other words, a user logs in a server by the client.

Block 202: the client reports its identity information (such as Internet Protocol (IP) address) to the server.

Block 203: the server searches for corresponding location information based on the identity information, and determines key value of the client. It should be noted that, the key value may be used as an index for pulling aggregated messages. The so-called aggregated messages are multiple microblog messages, which are aggregated based on a certain dimension (such as the location information).

Block 204: the client converts its identity information into local location information, displays the local location information for the user, converts its identity information into a key value, and enables to carry the key value when sending a message pulling request.

It should be noted that, key value is transmitted during communication process of the client and server, so that data packet length may be effectively reduced. A same conversion table is maintained by the client and server. That is, each of national, provincial, city name with longer length may be converted into a key value with less byte number. Thus, time and load of data communication between networks may be effectively reduced. In a specific implementation of the application, the conversion table may be a corresponding table between the location information and the key value.

Block 205: the server may aggregate microblog messages corresponding to the key value, and then send aggregated microblog messages to the client.

Figure 3:
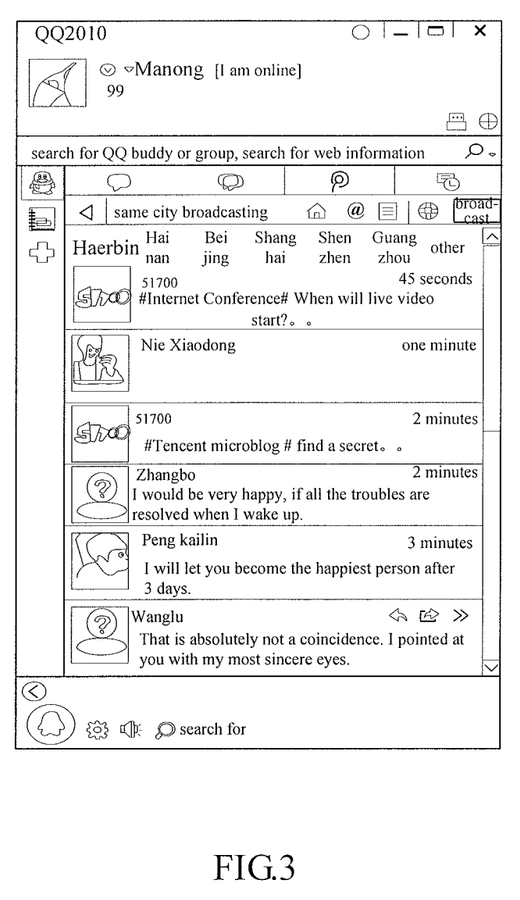
FIG. 3 is a diagram showing the effect of implementing the same city broadcasting geography page at an IM client.

FIG. 3 is a diagram showing effect of implementing the same city broadcasting geography page at an IM client. Haerbin is a user's local location. Therefore, when the user indicates to jump to the same city broadcasting geography page from a single message page, broadcasting messages in Haerbin are firstly displayed. As an example, Hainan is a history location selected by the user, while Beijing, Shanghai, Shenzhen, Guangzhou are four popular locations. The user clicks on Beijing and will enter Beijing's geography page. Broadcasting messages corresponding to Beijing may be displayed.

By adopting the technical solution put forward by the application, a user may conveniently and quickly find microblog messages or broadcasting messages posted by other users at a location current user is located (such as city, region, etc.). Furthermore, a microblog client or an IM client with a microblog module may provide information, such as historical location, popular location, for a user employing the client, to enable the user to obtain microblog messages related with the historical location, popular location. Thus, the user may be provided with more valuable and flexible services.

The foregoing is only preferred embodiments of the application, and is not for use in limiting protection scope of the application.

The invention claimed is:

1. A microblog client, comprising a message pulling module, a message pool and a geography page service module, wherein the message pulling module is to pull a microblog message from an external network server according to location information;

the message pool is to store the microblog message pulled by the message pulling module and the message pool monitors one or more geography pages, when a microblog message is displayed on a geography page, and increases a reference count of the microblog message by one, and when a geography page is deconstructed, decreases the reference count of each microblog message previously displayed on the geography page; and the geography page service module is to generate one or more geography pages, and display the microblog message on a corresponding geography page, based on the location information corresponding to the microblog message pulled.

2. The microblog client according to claim 1, wherein the message pulling module is to:

obtain corresponding local location information based on identity information of the microblog client, convert the local location information into a corresponding key value, send a message pulling request with the key value to the network server, and pull microblog message with corresponding key value in the network server to the microblog client.

3. The microblog client according to claim 2, wherein the message pulling module is further to:

convert history location information selected by a user of the microblog client or popular location information provided by the network server to a corresponding key value, send the message pulling request with the key value to the network server, and pull the microblog message with the corresponding key value in the network server to the microblog client.

4. The microblog client according to claim 2, wherein the geography page service module comprises a logic management sub-module, which is to configure a message pulling strategy; and the message pulling module is further to pull the microblog message from the network server, based on the message pulling strategy and the location information.

5. The microblog client according to claim 4, wherein the message pulling strategy comprises: number of messages obtained by a single pulling and total number of pulled messages, and the message pulling module is further to pull a corresponding number of the microblog message from the network server once, according to the number of messages obtained by a single pulling, trigger next pulling when detecting a scroll bar of a geography page is at the bottom, and stop pulling the microblog message when number of pulled messages reaches the total number of pulled messages.

6. The microblog client according to claim 2, wherein the message pool is further to:
   release a corresponding microblog message according to message elimination strategy, when number of stored messages reaches a message storing threshold.

7. The microblog client according to claim 6, wherein the message pool is further to:
   maintain the reference count of one or more microblog messages stored in the message pool, and determine the message elimination strategy according to the reference count.

8. The microblog client according to claim 2, wherein the geography page service module comprises a displaying sub-module, which is to:
   search in a container pool of the microblog client to determine whether there is an available control, when generating one or more geography pages, when there is the available control, obtain the control from the container pool, fill the control obtained with the microblog message; when there is no available control in the container pool, establish a necessary control, and fill the control established with the microblog message.

9. The microblog client according to claim 8, wherein the displaying sub-module is further to:
   deconstruct the one or more geography pages generated, and store each control of the geography page into the container pool.

10. A method for aggregating a microblog message, comprising:
    pulling, by a microblog client, the microblog message from a network server, according to location information;
    storing, by the microblog client, the microblog message pulled; generating, by the microblog client, one or more geography pages;
    displaying, by the microblog client, the microblog message pulled on a corresponding geography page, according to the location information of the microblog message pulled; and
    monitoring, by the microblog client, one or more geography pages, when a microblog message is displayed on a geography page, increasing reference count of the microblog message by one, when a geography page is deconstructed, decreasing the reference count of each microblog message previously displayed on the geography page by one, determining a message elimination strategy based on the reference count, and releasing the microblog messages stored in the microblog client.

11. The method according to claim 10, wherein pulling by the microblog client the microblog message from the network server according to the location information comprises:
    obtaining, by the microblog client, corresponding local location information according to identity information of the microblog client, converting the local location information into a corresponding key value, sending a message pulling request with the key value to the network server, and pulling the microblog message with the corresponding key value in the network server to the microblog client.

12. The method according to claim 11, further comprising:
    pulling, by the microblog client, a corresponding number of microblog messages from the network server once, according to a preset number of messages obtained by a single pulling, triggering next pulling when detecting a scroll bar of a geography page is at the bottom, and stopping pulling the microblog message when number of pulled messages reaches a preset total number of pulled messages.

13. The method according to claim 11, further comprising:
    determining, by the microblog client, whether there is an available control, when one or more geography pages are generated;
    when there is an available control, filling the available control with the microblog message to be displayed;
    when there is no available control, establishing a control, and filling the control established with the microblog message to be displayed.

14. The method according to claim 11, wherein the identity information is an Internet Protocol (IP) address.

15. The method according to claim 11, wherein pulling by the microblog client the microblog message from the network server according to the location information further comprises:
    converting, by the microblog client, history location information selected by the user or popular location information provided by the network server into a corresponding key value, sending a message pulling request with the key value to the network server, and pulling the microblog message with the corresponding key value in the network server to the microblog client.

16. An Instant Messaging (IM) client, comprising:
    a basic service module; and
    a microblog module,
    wherein the basic service module is to store a conversion table of location information and key value;
    the microblog module is to convert the location information as aggregation dimension into a corresponding key value based on the conversion table, send a message pulling message carrying the key value to an external network server, generate one or more geography pages, and display a microblog message on a corresponding geography page, based on the location information corresponding to the microblog message pulled; and
    wherein a message pool monitors one or more geography pages, when a microblog message is displayed on a geography page, and increases a reference count of the microblog message by one, and when a geography page is deconstructed, decreases the reference count of each microblog message previously displayed on the geography page.

17. The IM client according to claim 16, wherein the microblog module is to determine local location information according to identity information of the IM client, and convert the local location information determined to a corresponding key value according to the conversion table.

18. The IM client according to claim 17, wherein the microblog module is further to convert history location information selected by a user of the IM client or popular location information provided by the network server to a corresponding key value, according to the conversion table.

* * * * *